US012783901B2

(12) United States Patent
Kwon et al.

(10) Patent No.: US 12,783,901 B2
(45) Date of Patent: Nov. 3, 2026

(54) APPARATUS AND METHOD OF PERSONALIZED FEDERATED LEARNING BASED ON PARTIAL PARAMETERS SHARING

(71) Applicant: FOUNDATION OF SOONGSIL UNIVERSITY-INDUSTRY COOPERATION, Seoul (KR)

(72) Inventors: Min Hae Kwon, Seoul (KR); Mi Ru Kim, Seoul (KR); Hyo Seon Kye, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 645 days.

(21) Appl. No.: 18/219,691

(22) Filed: Jul. 9, 2023

(65) Prior Publication Data

US 2024/0242088 A1 Jul. 18, 2024

(30) Foreign Application Priority Data

Jan. 17, 2023 (KR) ........................ 10-2023-0007036

(51) Int. Cl.
*G06N 3/098* (2023.01)

(52) U.S. Cl.
CPC .................................... *G06N 3/098* (2023.01)

(58) Field of Classification Search
None
See application file for complete search history.

(56) References Cited

U.S. PATENT DOCUMENTS

2022/0398500 A1* 12/2022 Singhal .................. G06N 3/098
2023/0090616 A1* 3/2023 Nitta ...................... G06N 20/00
706/12

FOREIGN PATENT DOCUMENTS

CN 111476376 A 7/2020
CN 110263921 B * 6/2021 ............. G06N 3/045
(Continued)

OTHER PUBLICATIONS

IDS for Industrial Applications: A Federated Learning Approach with Active Personalization, Kelli et al (Year: 2021).*
(Continued)

*Primary Examiner* — Augustine K. Obisesan
(74) *Attorney, Agent, or Firm* — Bridgeway IP Law Group, PLLC; Sang Ho Lee; Hyun Woo Shin

(57) ABSTRACT

Provided is a method of personalized federated learning performed by an electronic device. The method is performed by an electronic device including one or more processors, a communication circuit which communicates with an external device, and one or more memories storing at least one instruction executed by the one or more processors. The method may include, by the one or more processors, training a local model using local data, in which the local model as an artificial neural network model includes a first parameter set corresponding to a global parameter set and a second parameter set corresponding to a local parameter set, transmitting the first parameter set to the external device, receiving a 1-1st parameter set for renewing the first parameter set from the external device, changing the first parameter set included in the local model to the 1-1st parameter set, and training the local model including the 1-1st parameter set.

10 Claims, 4 Drawing Sheets

(56) References Cited

FOREIGN PATENT DOCUMENTS

| | | | | | |
|---|---|---|---|---|---|
| CN | 114787824 | A | * | 7/2022 | ............. G06N 3/084 |
| KR | 10-2022-0117625 | A | | 8/2022 | |
| WO | 2021/080577 | A1 | | 4/2021 | |

OTHER PUBLICATIONS

Pillutla, Krishna et al., "Federated Learning with Partial Model Personalization", published at the 39th International Conference on Machine Learning, Baltimore, Maryland, USA, Proceedings of Machine Learning Research (PMLR) 162, 2022. arXiv:2204.03809v2.

Diao, Enmao et al., "HeteroFL: Computation and Communication Efficient Federated Learning for Heterogeneous Clients", published at the Ninth International Conference on Learning Representations (ICLR 2021). arXiv:2010.01264v3.

Hyoseon Kye et al., "Poster: Partial Federated Learning Based Network Intrusion System for Mobile Devices", MobiHoc '22, Oct. 2022, pp. 1-2.

* cited by examiner

APPARATUS AND METHOD OF PERSONALIZED FEDERATED LEARNING BASED ON PARTIAL PARAMETERS SHARING

CROSS-REFERENCE TO RELATED APPLICATIONS

This application claims the priority of Korean Patent Application No. 10-2023-0007036 filed on Jan. 17, 2023, in the Korean Intellectual Property Office, the disclosure of which is incorporated herein by reference.

STATEMENT REGARDING PRIOR DISCLOSURES BY THE INVENTOR OR A JOINT INVENTOR

The non-patent literature reference ("Poster: Partial Federated Learning Based Network Intrusion System for Mobile Devices", NPL citation No. 1) submitted herewith in an information disclosure statement pursuant to 37 CFR § 1.97 is a prior disclosure by the joint inventors made 1 year or less before the effective filing date of the instant application, and thus, is not prior art to the instant application as an exception under 35 USC § 102(b)(1).

BACKGROUND

Field

The present disclosure relates to a learning method of an artificial neural network model, and particularly, to a personalized federated learning technology based on partial parameters sharing.

Description of the Related Art

The conventional federated learning methods have the following problems because they communicate and share all the information of a model that progresses learning.

First, there is a problem that communication efficiency is reduced because an information amount to be communicated is large. Since resources for communication are limited, it is necessary to optimize the amount of communication for using the limited resources.

Second, since a global model, which is created as a result of federated learning, is the average of each local model, it is difficult to optimize the performance of each local data when the characteristics of local data are different. In other words, in order for the local model to show a high-performance for each local data, it is necessary to personalize the local model.

Therefore, a demand for a method for overcoming the problems as described above has increased in the art.

SUMMARY

According to various exemplary embodiments of the present disclosure, a technical object of the present disclosure is to provide a method of conducting federating learning by sharing only some parameters of an artificial neural network model, and personalizing the artificial neural network model using parameters not shared.

According to one aspect of the present disclosure, a method of personalized federated learning performed by an electronic device may be provided. The method is performed by an electronic device including one or more processors, a communication circuit which communicates with an external device, and one or more memories storing at least one instruction executed by the one or more processors. The method may include: by the one or more processors, training a local model using local data, in which the local model as an artificial neural network model includes a first parameter set corresponding to a global parameter set and a second parameter set corresponding to a local parameter set; transmitting the first parameter set to the external device; receiving a 1-1st parameter set for renewing the first parameter set from the external device; changing the first parameter set included in the local model to the 1-1st parameter set; and training the local model including the 1-1st parameter set.

In one exemplary embodiment, the first parameter set may be a global parameter set before a value is renewed, and the 1-1st parameter set may be a global parameter set after the value is renewed through the external device.

In one exemplary embodiment, the external device may be configured to receive the global parameter set from each of a plurality of electronic devices including the electronic device, and generate the 1-1st parameter set based on the plurality of received global parameter sets.

In one exemplary embodiment, the training of the local model may include fixing the 1-1st parameter set included in the local model not to be renewed, and training the local model to renew the second parameter set included in the local model.

In one exemplary embodiment, the local model may be an artificial neural network model including a plurality of layers having an order, the global parameter set may include parameters from a first layer to a specific layer included in the artificial neural network model, and the local parameter set may include parameters from a next layer of the specific layer to a last layer.

In one exemplary embodiment, the method further includes determining the size of the global parameter set, and the size of the global parameter set may be determined based on an information processing amount per unit time of the communication circuit.

In one exemplary embodiment, the determining the size of the global parameter set may include calculating a parameter capacity of each of the plurality of layers included in the local model, aggregating parameter capacities of respective layers from the first layer to the specific layer among the plurality of layers, judging whether the aggregated parameter capacity becomes the maximum while not exceeding the information processing amount per unit time, and determining the size of the global parameter set based on the aggregated parameter capacity when the aggregated parameter capacity becomes the maximum while not exceeding the information processing amount per unit time as a judgment result.

According to another aspect of the present disclosure, an electronic device may include: a communication circuit which communicates with an external device; one or more processors; and one or more memories storing instructions which cause the one or more processors to perform a calculation when being executed by the one or more processors, and the one or more processors may be configured to train a local model using local data, in which the local model as an artificial neural network model includes a first parameter set corresponding to a global parameter set and a second parameter set corresponding to a local parameter, transmit the first parameter set to the external device, receive a 1-1st parameter set for renewing the first parameter set from the external device, change the first parameter set included in the local model to the 1-1st parameter set, and train the local model including the 1-1st parameter set.

In one exemplary embodiment, the one or more processors may be configured to fix the 1-1st parameter set included in the local model not to be renewed, and train the local model to renew the second parameter set included in the local model.

In one exemplary embodiment, the one or more processors may be configured to determine the size of the global parameter set based on the information processing amount per unit time of the communication circuit.

According to at least one exemplary embodiment disclosed in the present disclosure, by sharing only some parameters of the artificial neural network model, the communication efficiency can be improved to learn the artificial neural network model.

According to at least one exemplary embodiment disclosed in the present disclosure, a personalized artificial neural network model can be effectively obtained by learning the artificial neural network model using parameters which are not shared.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
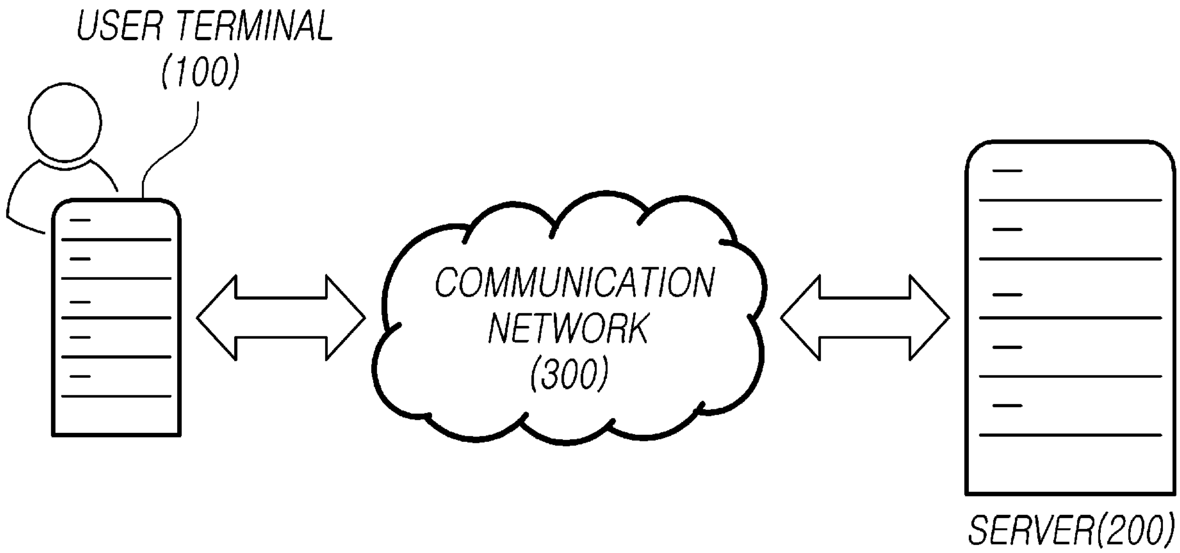
FIG. 1 is a diagram illustrating a system including a user terminal, a server, and a communication network according to one exemplary embodiment of the present disclosure.

Various exemplary embodiments described in the present disclosure are illustrated to clearly explain the technical ideas of the present disclosure, and are not intended to be limited to specific exemplary embodiments. The technical idea of the present disclosure includes various modifications, equalities, alternatives of each exemplary embodiment disclosed in this document, and one exemplary embodiment that is selectively combined from all or part of each exemplary embodiment described in this document. In addition, the scope of the rights of the technical idea of the present disclosure is not limited to various exemplary embodiments presented below or specific explanations.

Further, if not contrarily defined, all terms used herein including technological or scientific terms have meanings generally understood by a person with ordinary skill in the art.

Expressions such as "include", "can include", "provided", "can be provided", "have", or "can have", used in this document mean that targeted features (e.g., a function, an operation, or a component) exist, and do not exclude existence of other additional features. In other words, such expressions should be understood as open-ended terms that contain the possibility of including other exemplary embodiments.

The expression of the singular type used in this document may include a plural type meaning unless it means differently in context, which is similarly applied to the expression of the singular type described in the claim.

An expression such as "first" or "second" used in this document is used for distinguishing one object from other objects in referring to plurality of homogeneous objects, and does not limit the order or importance between the targets.

The expression "A, B, and C", "A, B, or C", "at least one of A, B, and C", or "at least one of A, B, or C" may mean each listed item or all possible combinations of the listed items. For example, "at least one of A or B" may refer to (1) at least one A, (2) at least one B, (3) both at least one A and at least one B.

The expression "based on" used in this document is used to describe one or more factors that affect an action or operation of determination and judgment, which is described in a phase or sentence including the corresponding expression, and this expression does not exclude an additional factor that affects the action or operation of the determination or judgment.

The expression that any component (e.g., a first component) is "connected to" or "accesses" the other component (e.g., a second component) used in this document may mean the any component being connected or accessing the other component via another new component (e.g., a third component) in addition to the any component being directly connected to or accessing the other component.

The expression "configured to" used in this document may have a meaning such as "set to", "have an ability to", changed to", "made to", or "can", according to the context. The corresponding expression is not limited to a meaning of "specially designed in hardware", and for example, a processor configured to perform a specific operation may mean a generic purpose processor which may perform the specific operation, or a special purpose computer structuralized through programming so as to perform the corresponding specific operation.

Hereinafter, various exemplary embodiments of the present disclosure will be described with reference to the accompanying drawings. In the accompanying drawings or descriptions for the drawings, the same or substantially equivalent component may be denoted by the same reference numeral. In addition, hereinafter, in the description of various exemplary embodiments, it may be omitted to redundantly describe the same or corresponding components, but this does not mean that the component is not included in the exemplary embodiment.

FIG. 1 is a diagram illustrating a system including a user terminal 100, a server 200, and a communication network 300 according to one exemplary embodiment of the present disclosure. The user terminal 100 and the server 200 may transmit or receive information from each other through the communication network 300.

The user terminal 100 may be an electronic device storing a local model that is subject to personalized federated learning according to the present disclosure. The user terminal 100, as an electronic device that transmits information on the local model to the server 200 which is connected wiredly or wirelessly, may be, for example, at least one of a smartphone, a tablet computer, a personal computer (PC), a mobile phone, a personal digital assistant (PDA), an audio player, and a wearable device.

The server 200 as a subject for processing a global parameter when performing personalized federated learning of each local model may be, for example, an application server, a proxy server, and a cloud server. Further, the server 200, as an electronic device different from the user terminal 100, may also be at least one of the smartphone, the tablet computer, the personal computer (PC), the mobile phone, the personal digital assistant (PDA), the audio player, and the wearable device.

In the present disclosure, when a configuration or an operation of one device is described, the term "device" is a term for referring to a device to be described, and the term "external device" may be used as a term for referring to a device which exists outside from the viewpoint of the device to be described. For example, when the user terminal 100 is described as a "device", the server 200 may be called as an "external device" from the viewpoint of the user terminal 100. In addition, for example, when the server 200 is described as a "device", the user terminal 100 may be called as an "external device" from the viewpoint of the server 200. That is, the user terminal 100 and the server 200 may be referred to as a "device" and an "external device", respectively, according to the viewpoint of an operating subject, or may be referred to as an "external device" and a "device", respectively.

The communication network 300 may include both wired and wireless networks. The communication network 300 may allow data to be exchanged between the user terminal 100 and the server 200. The wired communication network may include, for example, a communication network according to a scheme such as universal serial bus (USB), high-definition multimedia interface (HDMI), recommended standard-232 (RS-232), or plain old telephone service (POTS). The wireless communication network may include, for example, a communication according to a scheme such as enhanced mobile broadband (eMBB), ultra reliable low-latency communications (URLLC), massive machine type communications (MMTC), long-term evolution (LTE), LTE advance (LTE-A), new radio (NR), universal mobile telecommunications system (UMTS), global system for mobile communications (GSM), code division multiple access (CDMA), wideband CDMA (WCDMA), wireless broadband (WiBro), wireless fidelity (WiFi), Bluetooth, near field communication (NFC), global positioning system (GPS), or global navigation satellite system (GNSS). The communication network 300 of the present disclosure is not limited to the above-described examples, and may include various types of communication networks that allow data to be exchanged between a plurality of subjects or devices without a limitation.

Throughout the present disclosure, an artificial neural network model, a network function, a neural network, etc. may be used interchangeably as a term representing a specific data structure. The artificial neural network model may be generally constituted by an aggregate of calculation units which are mutually connected to each other, which may be called "nodes". The nodes may also be called neurons. The artificial neural network mode is configured to include one or more nodes. The nodes (or neurons) may be mutually connected to each other by one or more links.

In the artificial neural network model, one or more nodes connected through the link may relatively form a relationship between an input node and an output node. Concepts of the input node and the output node are relative, and any node which has the relationship as the output node with respect to one node may have the relationship as the input node in the relationship with another node and vice versa. As described above, the relationship of the output node to the input node may be generated based on the link. One or more output nodes may be connected to one input node through the link and vice versa. In the relationship of the input node and the output node connected through one link, a value of data of the output node may be determined based on data input in the input node. Here, a link connecting the input node and the output node to each other may have a weight. The weight may be variable, and the weight may be varied by a user or an algorithm in order for the artificial neural network model to perform a predetermined function. For example, when one or more input nodes are mutually connected to one output node by the respective links, the output node may determine an output node value based on values input in the input nodes connected with the output node and the weights set in the links corresponding to the respective input nodes. In the present disclosure the weight may also be referred to as "parameter".

The artificial neural network model may be constituted by a set of one or more nodes. A subset of the nodes included in the artificial neural network model may constitute a layer. Some of the nodes constituting the artificial neural network model may constitute one layer based on the distances from the initial input node. For example, a set of nodes of which distance from the initial input node is n may constitute n layers. The distance from the initial input node may be defined by the minimum number of links from the initial input node up to the corresponding node. However, a definition of the layer is arbitrary for description, and the order of a specific layer in the artificial neural network model may be defined by a method different from the aforementioned method. For example, the layers of the nodes may be defined by the distance from a final output node. The initial input node may mean one or more nodes in which data is directly input without passing through the links in the relationship with other nodes among the nodes in the artificial neural network model. Alternatively, in the artificial neural network model, in the relationship between the nodes based on the link, the initial input node may mean nodes which do not have other input nodes connected through the links. Similarly thereto, the final output node may mean one or more nodes which do not have the output node in the relationship with other nodes among the nodes in the artificial neural network model. Further, a hidden node may mean not the initial input node and the final output node but the nodes constituting the artificial neural network model.

The artificial neural network model may be trained by at least one scheme of supervised learning, unsupervised learning, semi-supervised learning, or reinforcement learning. The training of the artificial neural network model may be a process of renewing node weights included in the artificial neural network model so that the artificial neural network model calculates specific output data for specific input data.

The artificial neural network model may be trained in the direction of minimizing an error of an output (or output data). The artificial neural network model may be trained based on an operation of inputting training data into the artificial neural network model, an operation of obtaining the output data of the artificial neural network model for the input training data, an operation of calculating an error between the output data and a ground truth, and an operation of updating the weight of each node of the artificial neural network model by back-propagating the error toward an input layer from an output layer of the artificial neural network model in order to reduce the calculated error.

Figure 2:
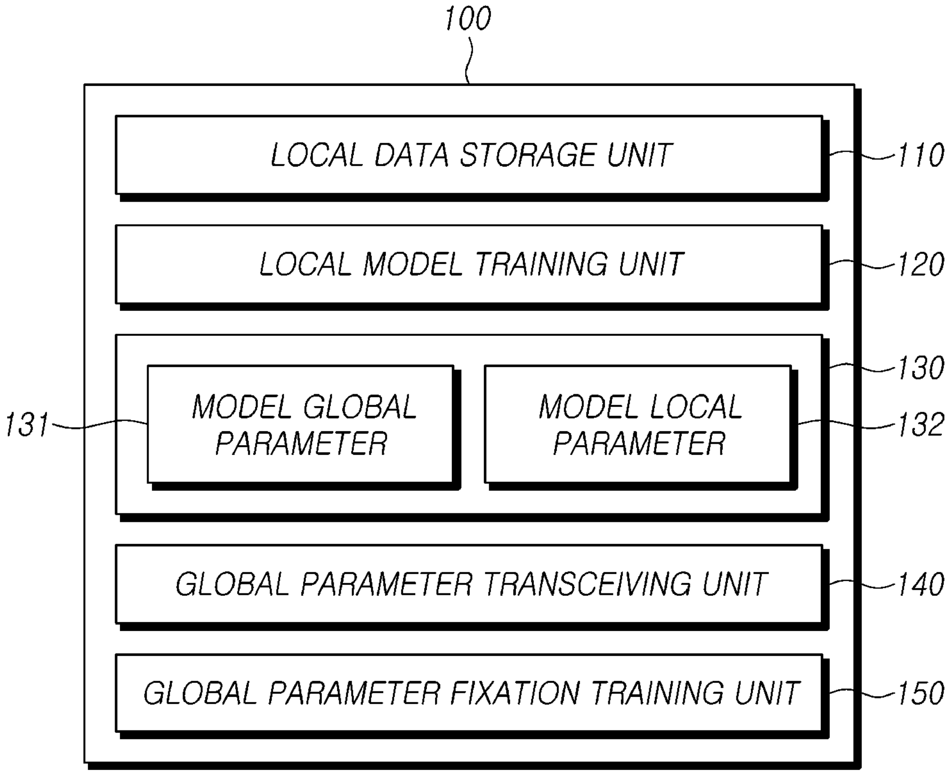
FIG. 2 is a diagram illustrating a user terminal which performs a method of personalized federated learning according to one exemplary embodiment of the present disclosure.

FIG. 2 is a diagram illustrating a user terminal 100 which performs a method of personalized federated learning according to one exemplary embodiment of the present disclosure.

The user terminal 100 may include a local data storage unit 110, a local model training unit 120, a local model storage unit 130, a global parameter transceiving unit 140, and a global parameter fixation training unit 150. In the present disclosure, "local model" may be an artificial neural network model.

The local data storage unit 110 is a kind of "memory", which may store data (i.e., local data) for training the local model. The data to be stored in the local data storage unit 110 may be data obtained, processed or used by at least one component of the user terminal 100. The data to be stored in the local data storage unit 110 may be data for training the local model, for example, image data, character string data, and time series data.

The local model training unit 120 as a kind of "processor" may perform operations such as various calculations, processing, and data generation or manufacturing required for training the local model. The local model training unit 120 may train the local model using the local data stored in the local data storage unit 110.

The local model storage unit 130 as a kind of "memory" may store data regarding a parameter of the local model (e.g., a weight or biased value). The local model storage unit 130 may include a global parameter storage unit 131 and a local parameter storage unit 132.

The global parameter storage unit 131 may include at least one global parameter. In the present disclosure, the "global parameter" may be used as a term that refers to a parameter of which value is renewed by means of a device (e.g., the server 200 or another user terminal) outside the user terminal 100 among the parameters included in the local model.

The local parameter storage unit 132 may include at least one local parameter. In the present disclosure, the "local parameter" may be used as a term that refers to a parameter of which value is renewed only by the user terminal 100 among the parameters included in the local model.

Hereinafter, in the present disclosure, each parameter included in the "local model" as the artificial neural network model may also be referred to as a "parameter". Further, for convenience of description, the set of the global parameters among the parameters included in the local model may be referred to as a "first parameter set" before renewal and a "1-1st parameter" after renewal to be distinguished from each other based on whether the parameter being updated by the external device (e.g., the server 200). Further, the set of the local parameters among the parameters included in the local model may be referred to as a "second parameter set".

The global parameter transceiving unit 140 as a kind of "communication circuit" may perform wireless or wired communication between the user terminal 100 and another device. The global parameter transceiving unit 140 may transmit and receive the set of the global parameter set included in the local model to and from the external device. For example, the global parameter transceiving unit 140 may perform wireless communication according to a scheme such as eMBB, URLLC, MMTC, LTE, LTE-A, NR, UMTS, GSM, CDMA, WCDMA, WiBro, WiFi, Bluetooth, NFC, GPS, or GNSS. Further, for example, the global parameter transceiving unit 140 may perform wired communication according to a scheme such as universal serial bus (USB), high-definition multimedia interface (HDMI), recommended standard-232 (RS-232), or plain old telephone service (POTS).

The global parameter fixation training unit 150 as a kind of "processor" may perform operations such as various calculations, processing, and data generation or manufacturing required for training the local model. The global parameter fixation training unit 150 operates similar to the local model training unit 120, but there is a difference that the local model training unit 120 renews both a first parameter set and a second parameter set while training a local model including the first parameter set and the second parameter set, while the global parameter fixation training unit 150 renews only the second parameter set while training a local model including the 1-1st parameter set and the second parameter set. The global parameter fixation training unit 150 may train the local model using the local data stored in the local data storage unit 110 or train the local model using another local data set.

The user terminal 100 may include one or more processors (not illustrated), communication circuits (not illustrated), or memories (not illustrated) as components in addition to the above-described configuration. In another exemplary embodiment, at least one of these components of the user terminal 100 may be omitted or another component may be added to the user terminal 100. In another exemplary embodiment, in addition, or in alternative to, some components may be integrated and implemented, or implemented as a single or a plurality of entities. At least some components of components inside or outside the user terminal 100 are connected to each other through bus, general purpose input/output (GPIO), serial peripheral interface (SPI), or mobile industry processor interface (MIPI) to transmit or receive data or a signal.

Figure 3:
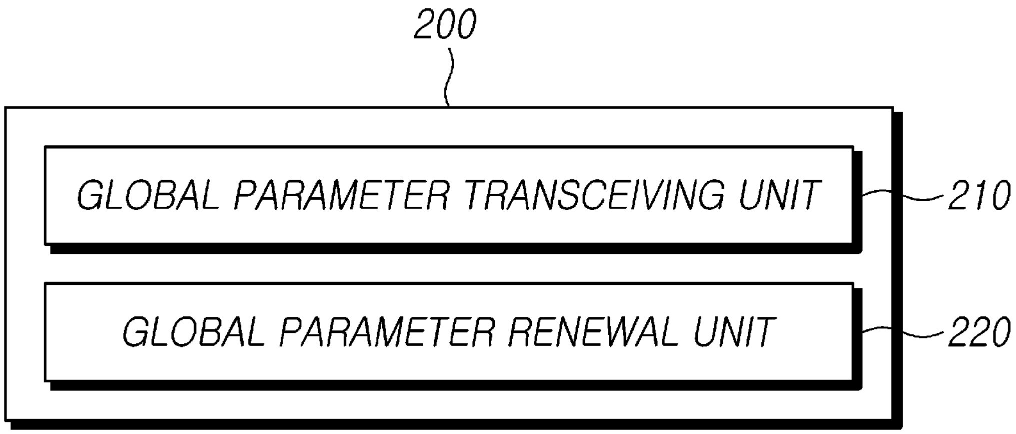
FIG. 3 is a diagram illustrating a server which performs the method of personalized federated learning according to one exemplary embodiment of the present disclosure.

FIG. 3 is a diagram illustrating a server 200 which performs the method of personalized federated learning according to one exemplary embodiment of the present disclosure. The server 200 may include a global parameter transceiving unit 210 and a global parameter renewal unit 220.

The global parameter transceiving unit 210 as a kind of "communication circuit" may perform wireless or wired communication between the server 200 and another device. The global parameter transceiving unit 210 may transmit and receive the global parameter set included in the local model according to the present disclosure to and from one or more external devices. For example, the global parameter transceiving unit 210 may perform wireless communication according to a scheme such as eMBB, URLLC, MMTC. LTE, LTE-A, NR, UMTS, GSM, CDMA, WCDMA, WiBro, WiFi, Bluetooth, NFC, GPS, or GNSS. Further, for example, the global parameter transceiving unit 210 may perform wired communication according to a scheme such as universal serial bus (USB), high-definition multimedia interface (HDMI), recommended standard-232 (RS-232), or plain old telephone service (POTS).

The global parameter renewal unit 220 as a kind of "processor" may perform operations such as various calculations, processing, data generation or manufacturing required to generate the renewed global parameter set based on a plurality of received global parameter sets. When the global parameter set renewed by the global parameter renewal unit 220 is generated, the server 200 may transmit and receive the renewed global parameter set through the global parameter transceiving unit 210 to and from one or more external devices (e.g., the user terminal 100).

The server 200 may include one or more processors (not illustrated), communication circuits (not illustrated), or memories (not illustrated) as components in addition to the above-described configuration. In another exemplary embodiment, at least one of the components of the server 200 may be omitted or another component may be added to the server 200. In another exemplary embodiment, in addition, or in alternative to, some components may be integrated and implemented, or implemented as a single or a plurality of entities. At least some components of components inside or outside the server 200 are connected to each other through bus, general purpose input/output (GPIO), serial peripheral interface (SPI), or mobile industry processor interface (MIPI) to transmit or receive data or a signal.

Figure 4:
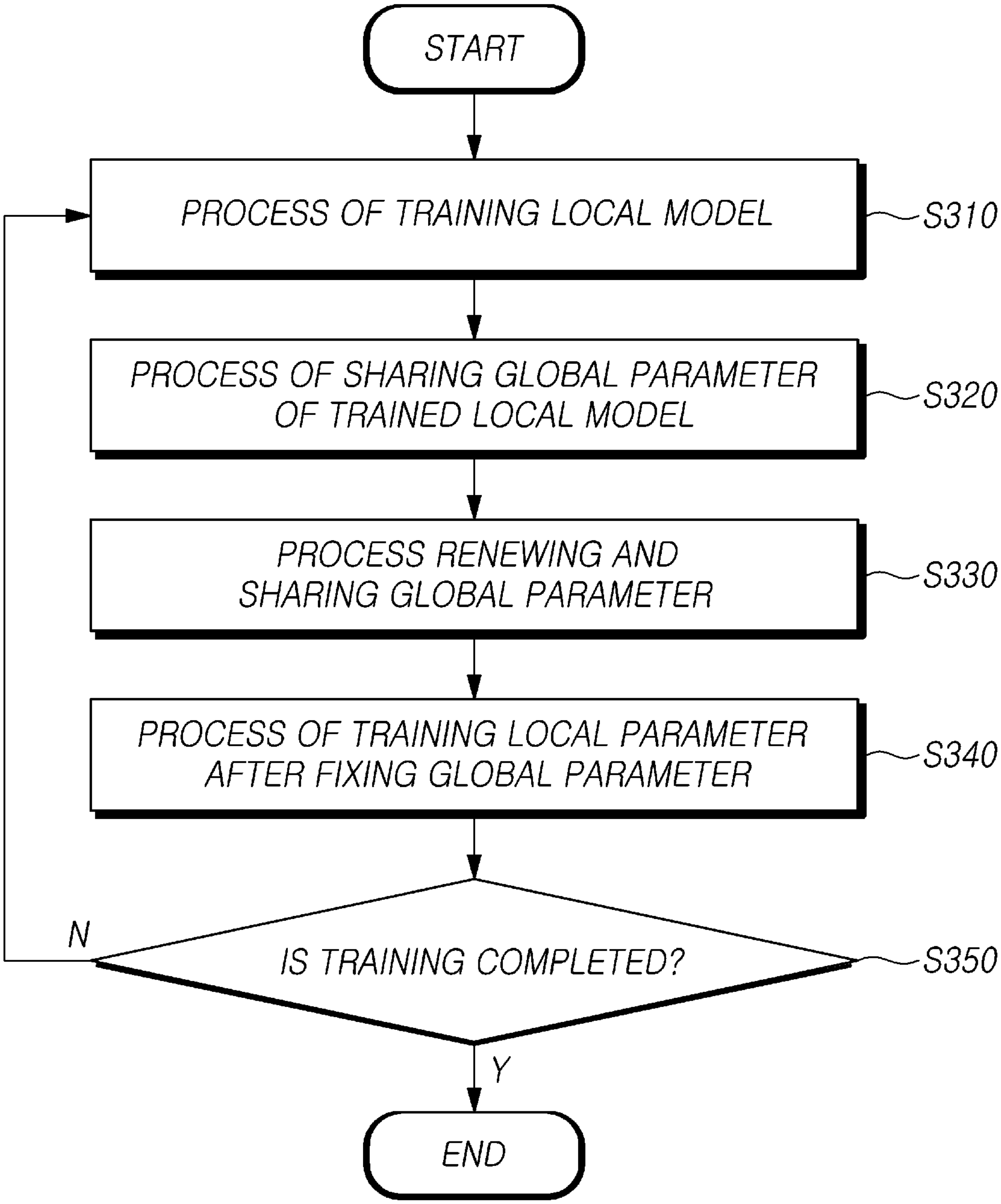
FIG. 4 is a flowchart illustrating each step of the method of personalized federated learning performed by a plurality of subjects according to one exemplary embodiment of the present disclosure.

FIG. 4 is a flowchart illustrating each step of the method of personalized federated learning performed by a plurality of subjects according to one exemplary embodiment of the present disclosure.

In a local model training process S310, the user terminal 100 may train a local model using local data. Specifically, the local model training unit 120 may train the local model using training local data stored in the local data storage unit 110. For example, when the local data stored in the local model storage unit 110 includes a dog image labeled with "0" and a cat image labeled with "1", the local model training unit 120 may train an image into which the local model is input into a cat or a dog using the local data.

As described above, a plurality of parameters constituting the trained local model may be divided into the global parameter set and the local parameter set. The parameters included in the global parameter set are parameters shared with the external device in a federated learning process, and the parameters included in the local parameter set may be parameters not shared with the external device in the federated learning process.

In a global parameter sharing process S320 of the local model, the user terminal 100 may transmit the global parameter set (i.e., the first parameter set) included in the local model to the server 200. Specifically, the global parameter transceiving unit 140 of the user terminal 100 transmits the first parameter set, and the global parameter transceiving unit 210 of the server 200 may receive the transmitted first parameter set. In this case, other user terminals may transmit the global parameter set included in each the local model to the server 200. In the present disclosure, the global parameter is shared and only required information is shared without a need of sharing all information of the artificial neural network model stored by each of a plurality of user terminals, thereby enabling efficient communication.

In a global parameter renewal and sharing process S330, the server 200 may generate a renewed global parameter set based on the global parameter set received from a plurality of electronic devices (e.g., a plurality of user terminals), and transmit the renewed global parameter set to the user terminal 100. Specifically, the global parameter transceiving unit 210 of the server 200 receives the global parameter set from a plurality of user terminals, and the global parameter renewal unit 220 of the server 200 may generate the renewed global parameter set by averaging, aggregating, or weighted-averaging a plurality of received global parameter sets. Next, the global parameter transceiving unit 210 of the server 200 may transmit the renewed global parameter set (i.e., the 1-1st parameter set) to the user terminal 100 again.

Next, in a local parameter training process S340, after fixing the shared global parameter, the user terminal 100 may train the local model again using the renewed parameter set received from the server 200.

Specifically, the global parameter transceiving unit 140 of the user terminal 100 receives the renewed global parameter set (the 1-1st parameter set) from the server 200, and the global parameter fixation training unit 150 may change the existing global parameter set (the first parameter set) included in the local model to the renewed parameter set (the 1-1st parameter set). Thereafter, the global parameter fixation training unit 150 fixes the 1-1st parameter set included in the local model not to be renewed, and may train the local model to renew the second parameter set included in the local model.

Thereafter, the local model training unit 120 of the user terminal 100 releases the fixation of the 1-1st parameter set, and may totally train the local model including the 1-1st parameter set and the second parameter set.

Through this, the user terminal 100 may generate a local model including a personalized local parameter set according to characteristics of the local data utilizing the global parameter set renewed by the server 200.

Next, in step S350, the user terminal 100 judges whether training is completed, and when the training is not completed, the user terminal 100 may train the local model by repeating steps S310 to S340 described above n times or more (n is a natural number of 2 or more). Whether the training is completed may be judged by the user terminal 100 according to various exemplary embodiments such as a case where accuracy for a test data set exceeds a threshold or a case where the training is performed at a predetermined number of repetition times.

The local model of the present disclosure as the artificial neural network model may include a plurality of layers (e.g., layer_1, layer_2, . . . , layer_N) having an order. The order between the plurality of layers may be an order according to a direction in which data is delivered in the process of forwarding data. The global parameter set included in the local model may be a parameter set including parameters from a first layer (layer_1) to a specific layer (layer_t, t is larger than 1 and smaller than N) included in the artificial neural network model. In addition, the local parameter set included in the local model may be a parameter set of parameters from a next layer (layer_t+1) of a specific layer to a last layer (layer_N).

In one exemplary embodiment of the present disclosure, the local model may be an autoencoder model. The autoencoder model as a type of artificial neural network model may be an artificial neural network model that is trained to output output data similar to input data. The autoencoder model may include at least one hidden layer disposed between the input and output layers. The autoencoder model may include an encoder reducing a dimension of input data and a decoder reconstructing the reduced data again. The number of nodes included in each layer of the autoencoder decreases from the input layer corresponding to the encoder to an intermediate layer (or bottleneck layer), and then may increase from the intermediate layer corresponding to the decoder to the output layer. In this case, the intermediate layer (or bottleneck layer) may be a term which refers to a layer having a smallest number of nodes positioned between the encoder and the decoder. The autoencoder model outputs reconstruction data x' through a process of reducing and reconstructing input original data x.

When the local model is the autoencoder model, the global parameter set includes at least one parameter included in the encoder, and the local parameter set may be a set including at least one parameter included in the decoder. Through this, the user terminal 100 of the present disclosure obtains an optimal encoder by sharing only an encoder part serving to reduce the dimension of the input data in the autoencoder model with the plurality of user terminals, and trains a decoder part which reconstructs the reduced data similarly to the input data with personal local data to train the local model using personal information jointly with enhanced security.

In one exemplary embodiment of the present disclosure, the size of the global parameter set shared with the external device among the plurality of parameters included in the local model may be determined according to a predetermined method. In one exemplary embodiment, the size of the global parameter set may be determined based on an information processing amount per unit time of the communication circuit included in the user terminal 100. The information processing amount per unit time as an information amount which may pass through a data connection within a predetermined time means a physical amount which may be measured at a specific bit size per second, such as Mbps, Gbps, Kbps, and bps.

Figure 5:
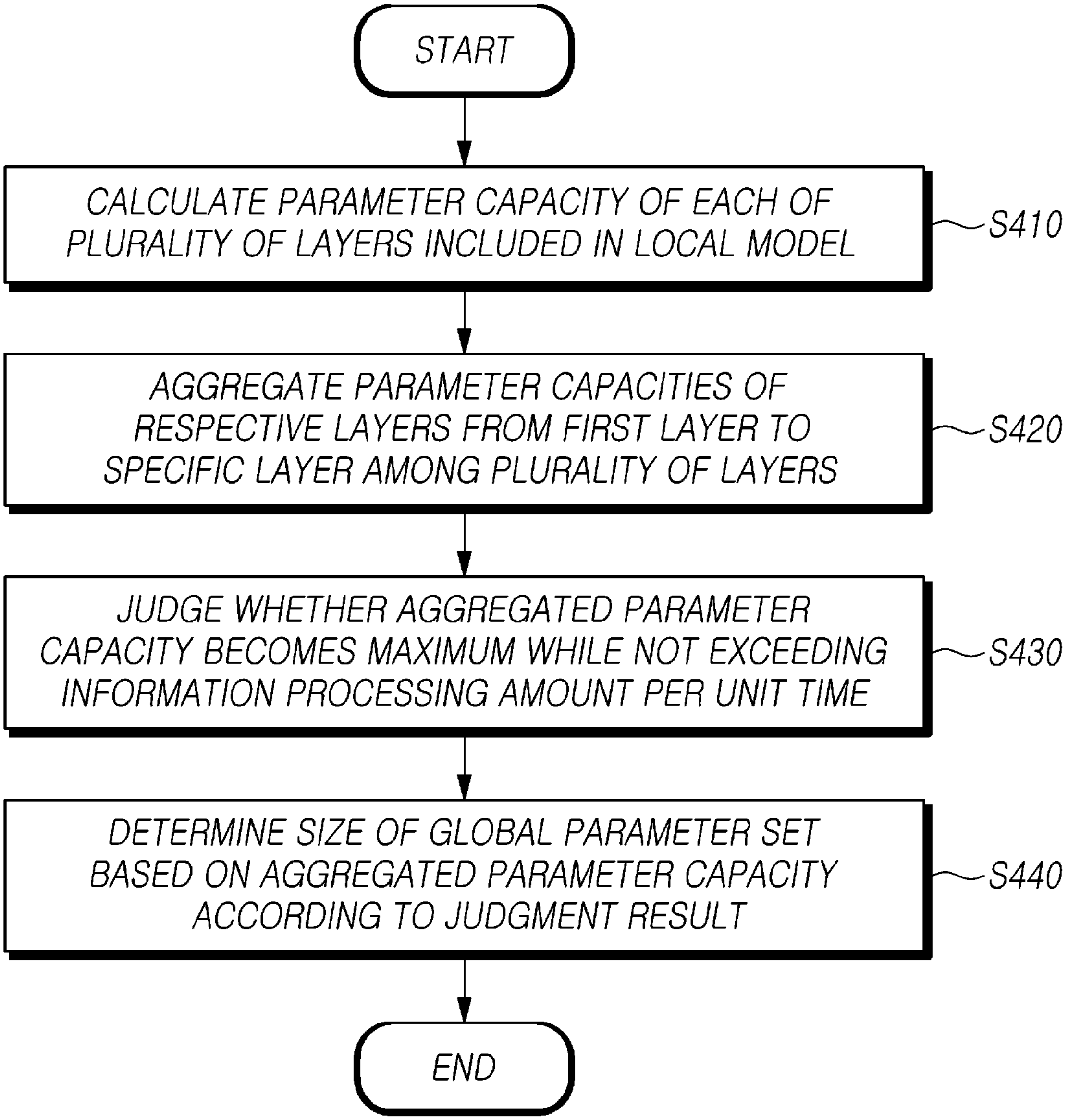
FIG. 5 is a flowchart illustrating each step of an operation of determining a size of a global parameter set based on an information processing amount per unit time according to one exemplary embodiment of the present disclosure.

FIG. 5 is a flowchart illustrating each step of an operation of determining a size of a global parameter set based on an information processing amount per unit time according to one exemplary embodiment of the present disclosure. Hereinafter, with reference to FIG. 5, for convenience of description, it is assumed that the information processing amount per unit time is 250 Kbps.

The user terminal 100 may calculate a parameter capacity of each of a plurality of layers included in the local model in step S410. For example, when it is assumed that the local model includes a total of four layers, the user terminal 100 may calculate a parameter capacity of a first layer as 85 Kb, a parameter capacity of a second layer as 39 Kb, a parameter capacity of a third layer as 128 Kb, and a parameter capacity of a fourth layer as 4 Kb.

Next, the user terminal 100 may aggregate the parameter capacities of the respective layers from a first layer to a specific layer (i.e., n-th layer) among the plurality of layers in step S420. Continuously to the assumption, when it is aggregated from the first layer to the second layer, the aggregated parameter capacity is 124 Kb (=85 Kb+39 Kb), when it is aggregated from the first layer to the third layer, the parameter capacity is 252 Kb (=85 Kb+39 Kb+128 Kb), and when it is aggregated from the first layer to the fourth layer, the parameter capacity may be calculated as 256 Kb (=85 Kb+39 Kb+128 Kb+4 Kb), respectively.

The user terminal 100 may judge whether the aggregated parameter capacities become the maximum while not exceeding the information processing amount per unit time in step S430. The above-described judgment process may be expressed by Equation 1 below, for example.

$$\alpha^* = \underset{\alpha}{\operatorname{argmin}} f\left(\omega - \sum_{i=1}^{\alpha * L} l_i\right),\ f(x) = \begin{cases} \infty, & x < 0 \\ x, & x \geq 0 \end{cases} \quad \text{[Equation 1]}$$

In Equation 1, l represents the order of each layer, and $l_i$ represents a capacity of the order layer. Further, ω represents the information processing amount per unit time (e.g., 250 Kb), L represents the total number of layers (e.g., 4), and α represents a sharing ratio (e.g., k/L, k is a natural number of 1 to L, inclusive). In Equation 1, since a function f(x) is divergent to infinity when x is a negative number, α* which minimizes f(x) may be a sharing ratio that determines the largest aggregated parameter capacity under a condition the aggregated parameter capacity does not exceed the information processing amount ω per unit time among the sharing ratios α.

Under the assumption of step S410 described above, when the sharing ratio is 0.25 (=¼), a calculation equation by Equation 1 is shown by Equation 2 below.

$$f\left(\omega - \sum_{i=1}^{0.25*4} l_i\right) = 165 \quad \text{[Equation 2]}$$

In addition, when the sharing ratio is 0.5 (=2/4), the calculation equation by Equation 1 is shown by Equation 3 below.

$$f\left(\omega - \sum_{i=1}^{0.5*4} l_i\right) = 126 \quad \text{[Equation 3]}$$

In addition, when the sharing ratio is 0.75 (=¾), the calculation equation by Equation 1 is shown in Equation 4 below.

$$f\left(\omega - \sum_{i=1}^{0.75*4} l_i\right) = \infty \quad \text{[Equation 4]}$$

Therefore, since an aggregation result from the first layer to the third layer is 252 Kb, the parameter capacity exceeds the information processing amount per unit time 250 Kb, so 124 Kb which is the aggregation result from the first layer to the second layer becomes the maximum value under the above-described condition.

As a judgment result of step S430, when the aggregated parameter capacity becomes the maximum while not exceeding the information processing time per unit time, the user terminal 100 may determine the size of the global parameter set based on the aggregated parameter capacity S440. That is, under the above-described assumption, the user terminal 100 makes the parameters of the first layer and the second layer be included in the global parameter set as the global parameters to determine the size of the global parameter set.

According to the present disclosure described above, there is an advantage in that even though the local data of each user terminal is not sufficient to train all models, the global parameter set of the model is shared to obtain the optimal parameter set, while the local parameter set which is the remaining parameter set trains using the local data of each user terminal to generate a personalized model.

In the flowchart according to the present disclosure, respective steps of the method or algorithm are described in a sequential order, but the respective steps may be performed in an order which may be arbitrarily combined in addition to being performed sequentially. The description of the flowchart of the present disclosure does not exclude the case that the method or algorithm is changed or modified, and does not mean that any step is essential or preferred. In one exemplary embodiment, at least some steps may be performed in parallel, repeatedly, or heuristically. In one exemplary embodiment, at least some steps may be omitted or another step may be added.

Various exemplary embodiments according to the present disclosure may be implemented as software in a machine-readable storage medium. The software may be software for implementing various exemplary embodiments of the present disclosure. The software may be inferred from various exemplary embodiments of the present disclosure by programmers in the technical field to which the present disclosure belongs.

For example, the software may be a program that includes a machine-readable instruction (e.g., code or code segment). The device as a device that may operate according to an instruction called from the storage medium may be, for example, a computer. In one exemplary embodiment, the device may be a computing device according to various exemplary embodiments of the present disclosure. In one exemplary embodiment, the processor of the device executes the called instruction to enable components of the device to perform a function corresponding to the instruction. In one exemplary embodiment, the processor may be a processor according to the exemplary embodiments of the present disclosure. The storage medium may mean all types of recording media in which data is stored, and may be read by the device. The storage medium may mean all kinds of recording medium. The storage medium may include, for example, ROM, RAM, CD-ROM, magnetic tape, floppy disk, and optical data storage device. In one exemplary embodiment, the storage medium may be a memory. In one exemplary embodiment, the storage medium may also be implemented as a form distributed in a computer system connected by a network. The software may be distributed, stored, and executed in the computer system. The storage medium may be a non-transitory storage medium. The non-transitory storage medium means a tangible medium which is present regardless of data being stored semi-permanently or temporarily, but does not include a signal which is propagated transitorily.

Although the technical idea according to the present disclosure has been explained by various exemplary embodiments hereinabove, the technical idea according to the present disclosure includes various substitutions, modifications, and changes that may be made within a scope which may be appreciated by those skilled in the art to which the present disclosure belongs. Further, it should be appreciated that the substitutions, modifications, and changes may be included in the appended claims.

What is claimed is:

1. A method of personalized federated learning, which is performed by an electronic device including one or more processors, a communication circuit which communicates with an external device, and one or more memories storing at least one instruction executed by the one or more processors, the method comprising:

by the one or more processors, training a local model using local data, wherein the local model as an artificial neural network model includes a first parameter set corresponding to a global parameter set and a second parameter set corresponding to a local parameter set;

transmitting the first parameter set to the external device;

receiving a 1-1st parameter set for renewing the first parameter set from the external device;

changing the first parameter set included in the local model to the 1-1st parameter set;

training the local model including the 1-1st parameter set; and determining a size of the global parameter set, wherein the size of the global parameter set is determined based on an information processing amount per unit time of the communication circuit, wherein the determining the size of the global parameter set includes:

calculating a parameter capacity of each of a plurality of layers included in the local model, aggregating parameter capacities of respective layers from the first layer to a specific layer among the plurality of layers, judging whether the aggregated parameter capacity becomes a maximum while not exceeding the information processing amount per unit time, and determining the size of the global parameter set based on the aggregated parameter capacity when the aggregated parameter capacity becomes the maximum while not exceeding the information processing amount per unit time as a judgment result, and wherein the judging is calculated through Equation 1:

$$\alpha^* = \underset{\alpha}{\arg\min}\, f\left(\omega - \sum_{i=1}^{\alpha * L} l_i\right),\ f(x) = \begin{cases} \infty, & x < 0 \\ x, & x \geq 0 \end{cases}, \quad \text{[Equation 1]}$$

wherein i represents a layer order, $l_i$ represents a capacity of i-th layer, ω represents the information processing amount per unit time, L represents a total number of layers, and α represents a sharing ratio.

2. The method of claim 1, wherein the first parameter set is a global parameter set before a value is renewed, and the 1-1st parameter set is a global parameter set after the value is renewed through the external device.

3. The method of claim 1, wherein the external device is configured to receive the global parameter set from each of a plurality of electronic devices including the electronic device, and generate the 1-1st parameter set based on the plurality of received global parameter sets.

4. The method of personalized federated learning of claim 1, wherein the training of the local model includes fixing the 1-1st parameter set included in the local model not to be renewed, and training the local model to renew the second parameter set included in the local model.

5. The method of personalized federated learning of claim 1, wherein the local model is an artificial neural network model including a plurality of layers having an order, the global parameter set includes parameters from a first layer to a specific layer included in the artificial neural network model, and the local parameter set includes parameters from a next layer of the specific layer to a last layer.

6. The method of claim 4, further comprising:

releasing a fixation of the 1-1st parameter set; and training the local model including the 1-1st parameter set and the second parameter set to renew both the 1-1st parameter set and the second parameter set.

7. An electronic device, comprising:

a communication circuit which communicates with an external device;

one or more processors; and one or more memories storing instructions which cause the one or more processors to perform a calculation when being executed by the one or more processors, wherein the one or more processors are configured to;

train a local model using local data, wherein the local model as an artificial neural network model includes a first parameter set corresponding to a global parameter set and a second parameter set corresponding to a local parameter, transmit the first parameter set to the external device, receive a 1-1st parameter set for renewing the first parameter set from the external device, change the first parameter set included in the local model to the 1-1st parameter set, train the local model including the 1-1st parameter set, and determine a size of the global parameter set, wherein the size of the global parameter set is determined based on an information processing amount per unit time of the communication circuit, wherein the determining the size of the global parameter set includes:

calculating a parameter capacity of each of a plurality of layers included in the local model, aggregating parameter capacities of respective layers from the first layer to a specific layer among the plurality of layers, judging whether the aggregated parameter capacity becomes a maximum while not exceeding the information processing amount per unit time, and determining the size of the global parameter set based on the aggregated parameter capacity when the aggregated parameter capacity becomes the maximum while not exceeding the information processing amount per unit time as a judgment result, and wherein the judging is calculated through Equation 1:

$$\alpha^* = \underset{\alpha}{\arg\min} f\left(\omega - \sum_{i=1}^{\alpha * L} l_i\right), \quad f(x) = \begin{cases} \infty, & x < 0 \\ x, & x \geq 0 \end{cases}, \qquad \text{[Equation 1]}$$

wherein i represents a layer order, $l_i$ represents a capacity of i-th layer, ω represents the information processing amount per unit time, L represents a total number of layers, and α represents a sharing ratio.

8. The electronic device of claim 7, wherein the one or more processors are configured to fix the 1-1st parameter set included in the local model not to be renewed, and train the local model to renew the second parameter set included in the local model.

9. The electronic device of claim 8, wherein the one or more processors are configured to release a fixation of the 1-1st parameter set, and train the local model including the 1-1st parameter set and the second parameter set to renew both the 1-1st parameter set and the second parameter set.

10. The electronic device of claim 7, wherein the one or more processors are configured to determine the size of the global parameter set based on the information processing amount per unit time of the communication circuit.

* * * * *